Feb. 16, 1937.  B. A. BENSON  2,070,706
DUPLEX ELECTRIC WAFFLE IRON
Filed June 1, 1936   2 Sheets-Sheet 1

Inventor:
Bernhart A. Benson
by Albert Scheible
Attorney.

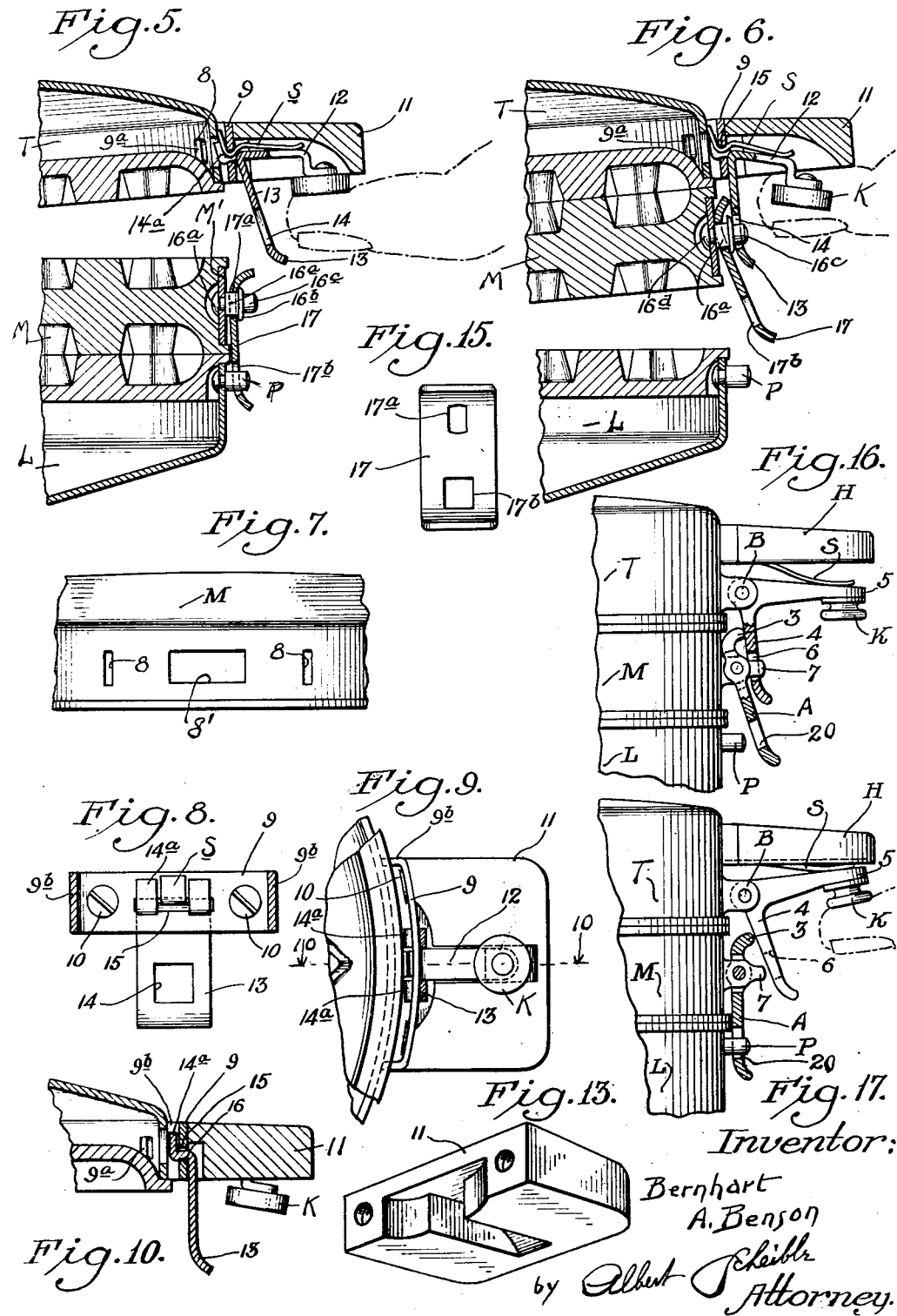

Patented Feb. 16, 1937

2,070,706

UNITED STATES PATENT OFFICE 2,070,706

DUPLEX ELECTRIC WAFFLE IRON

Bernhart A. Benson, Chicago, Ill., assignor to Chicago Electric Manufacturing Company, Chicago, Ill., a corporation of Illinois Application June 1, 1936, Serial No. 82,741

16 Claims. (Cl. 53—10)

My invention relates to an electric baking appliance, such as a waffle iron, in which three grid-equipped and superposed sections are operatively interhinged at the same side of the appliance and adapted for simultaneously baking two batches of batter respectively contiguous to the upper and the lower face of the middle grid.

For convenient use, such an appliance requires means whereby the user can raise the upper grid alone for pouring batter on the middle grid and for removing the corresponding waffle when baked, as also for raising both the middle and the top section for pouring batter on the lowest grid and later on removing the waffle baked on that grid. It likewise is highly desirable to have the two lower grids effectively interlocked so that the middle grid will remain stationary while the top grid is raised; and also to have the upper two sections interlocked when they are being conjointly raised by a single handle on the top section.

In the only heretofore proposed selective latching means for the above purposes, the number of parts and fastening elements undesirably increased the cost, and some of the parts were easily clogged by overflowing batter. My present invention aims to overcome these objections, and also aims to provide a selective latching mechanism which will require fewer manipulations by the user.

In the drawings, Fig. 1 is a side elevation of a three-section waffle iron equipped with my new selective section-interlocking provision, with the latch parts in their normal position.

Fig. 5 is a section allied to Fig. 3, showing the top section as partly raised after the upper latching member had been digitally raised from its normal position of Fig. 3 to leave the middle section latched to the bottom section.

Fig. 6 is a section also allied to Fig. 3, showing the upper section as partly raised without a digital pressure on the knob of the upper latching member so that this member causes a lifting of the handle to raise the top and middle section conjointly.

Fig. 7 is a fragmentary elevation of the casing of the upper section taken from the same side as Fig. 2, showing certain perforations.

Fig. 8 is a section taken along the line 8—8 of Fig. 4, showing the parts which extend through the horizontal slot in the handle-carrying bracket, namely the fingers on the upper (bell-crank) lever and the inner end portion of a spring.

Fig. 9 is a section taken along the line 9—9 of Fig. 1, looking upward.

Fig. 10 is a vertical section taken along the line 10—10 of Fig. 4.

Fig. 13 is a bottom perspective view of the handle.

Fig. 15 is an exterior elevation of the just mentioned lower lever.

Fig. 16 is a fragmentary elevation, allied to the right-hand portion of Fig. 1, showing a modified form of my latching provisions in their normal position.

Fig. 17 is a view similar to Fig. 16 but taken after the upper latching lever has been digitally raised.

Figure 1:
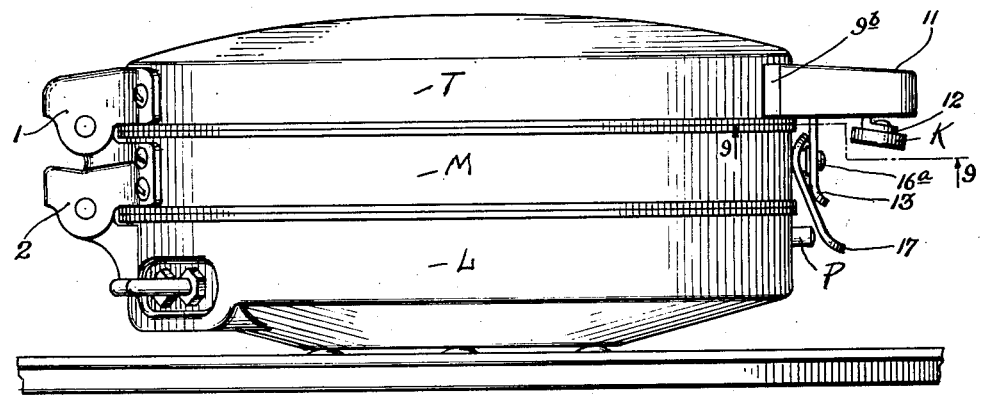
Figure 2:
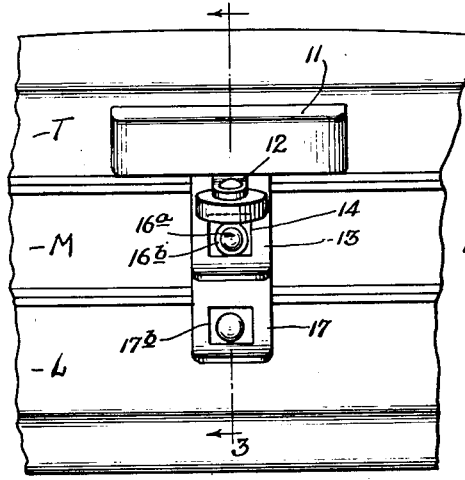
Fig. 2 is an enlarged and fragmentary elevation taken from the right-hand side of Fig. 1.
Figure 3:
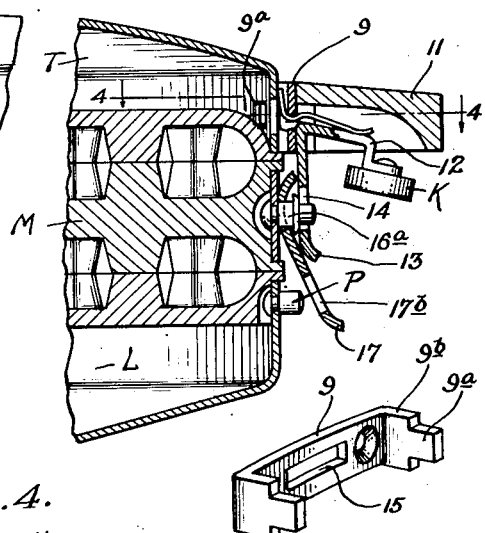
Fig. 3 is a fragmentary vertical section taken along the line 3—3 of Fig. 2, showing the latch parts in their normal position.

In a waffle iron of the recited class, the middle section M is connected (as in Fig. 1) to the top section T by an upper hinge 1 and to the lower section L by a relatively superposed lower hinge 2, and the said upper section supports a handle H projecting at the opposite side of the appliance from the said hinges.

In the more diagrammatic illustrations of Figs. 16 and 17, the lower section L has a pin P projecting radially from it below the handle, and the middle section has a relatively superposed projecting pin 7. Rockingly mounted on the middle section pin 7, for movement about a horizontal axis, is a lower and generally upright lever with its downwardly extending and longer arm A normally depending by gravity alongside the adjacent portions of the two lower sections. This arm A has a perforation 20 alining with but of somewhat greater height than the lower pin P, and the companion or upwardly extending arm 3 of the said lower lever is shorter and curved away from the middle section M.

The upper section T has a bracket B projecting from it and overhanging the said arm 3, and an upper bell-crank lever is pivoted upon this bracket below a handle H supported by the top section T. This bell-crank lever comprises a depending arm 4 which bears continuously against the free end of the upper arm 3 of the lower lever, and an upper arm 5 which extends below and in the same general direction as the said handle. Interposed between this upper arm of the bell-crank lever and the handle is a spring S which continually urges the upper lever arm 5 downwardly with such force that the depending lever arm 4 presses the curved upper arm 3 of the lower lever against the middle section M of the waffle iron, thereby holding the lower arm A of the lower lever outwardly beyond the lower pin P as shown in Fig. 16.

The depending arm 4 of the bell-crank lever also has a perforation 6 disposed so that the projecting pin 7 on the middle section M will extend through this perforation when the said arm is thus disposed in its normal position of Fig. 16. Consequently, this depending arm normally latches the middle section to the upper section, whereby the bottom of the perforation 6 hookingly underhangs the pin 7 so that a mere raising of the handle H in Fig. 16 will lift the two upper sections conjointly.

However, if the user has pressed a knob K on the outer end of the upper arm 5 of the bellcrank lever upwardly against the resistance of the spring S before raising the handle, so as to swing the bell-crank lever to the position of Fig. 17, the lower lever swings by gravity to the illustrated position in which the lower pin P extends through the perforation 20 in the lower arm A of the lower lever to latch the middle section M to the lowest section L, while the depending arm 4 of the bell-crank lever clears the pin p on the middle section. Consequently, such a preliminary upward pressing on the knob K (which the user can readily effect by a finger of the hand grasping the handle) enables the user to raise the upper section alone.

To make my latch provision more compact, more easily assembled and less conspicuous than in the just described embodiment of Figs. 16 and 17, I desirably employ the structural details shown in Figs. 1 to 15, in which the spring as well as most of the digitally moved lever arm are concealed by the handle, and in which neither one of the levers requires a horizontal pivot pin. For this simplification, I provide the handle side of the casing of the upper section M with two upright and spaced slots 8 (Fig. 7) for respectively receiving end fingers 9a on the shanks 9b of a U-shaped handle-carrying bracket 9 which is fastened (as in Fig. 4) by screws 10 to a generally flat and horizontal handle 11 of heat-insulating material, the said arms 9b being sufficiently long to space the main bracket part 9 from the said perforated casing side when the fingers of the bracket are clinched over as in Fig. 4. This handle has lower portions cut away as shown in Fig. 13, for housing and concealing certain operative parts of my latching mechanism.

For the bell-crank lever I provide a stiff metal punching (Fig. 12) including an upper arm 12, the outer end of which carries the depending knob K, and a relatively wider depending arm 13 having a perforation 14. In addition, this punching includes two laterally spaced fingers 14a extending from the juncture of the said arms 12 and 13 in the opposite direction from the upper arm 12, the joint spread of these fingers being slightly less than the length of a horizontal slot 15 (Fig. 11) in the main part 9 of the handle-carrying bracket.

Each of these fingers 14a is bent flatwise to an S curve to present an upwardly directed end portion, so that the downwardly concaved curve portion 16 (Fig. 12) can hook over the bottom of the bracket slot 15 to make that slot bottom serve as a pivot on which the lever will rock when the said fingers have been inserted through the said slot. Before then attaching the handle 11 to the said bracket, I also insert through the same slot the inward portion of a spring S made from a strip of resilient metal. This spring is bent so as to present an upwardly concaved curved portion which underhangs the upper edge of the bracket slot (as in Figs. 3, 5 and 6) when the inner end of the spring bears against the adjacent shell of the upper section M, while the outer end portion of the spring presses downwardly against the upper arm 12 of the bell-crank lever as in Figs. 5 and 6.

Figures 4, 11, 12, 14:
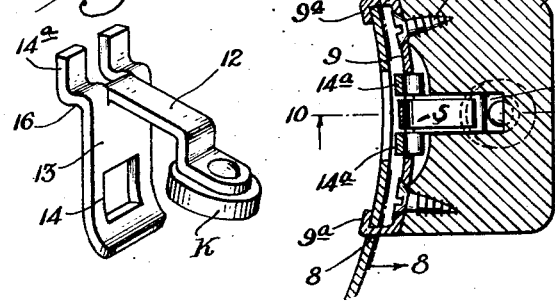
Fig. 4 is a fragmentary horizontal section taken along the line 4—4 of Fig. 3.
Fig. 11 is an interior perspective view of the handle-supporting bracket which is fastened to the top section and upon which the upper (bell-crank) lever is pivoted.
Fig. 12 is a perspective view of the upper (bell-crank lever type) latching member.
Fig. 14 is a perspective view of the latch pin which is fastened to the middle section and on which the obtuse-angled and generally upright lower lever is pivoted.

To co-operate with the perforation 14 in the depending arm 13 of the bell-crank lever of Fig. 12 for releasably interlocking the upper two sections of my waffle iron I provide an upper latch post initially formed as in Fig. 14 so as also to serve as a pivot for the lower level. This post includes a mid-length portion 16a having two upright flattened sides and a convexed upper edge, and having a peripheral bead 16b at its outer end, as also a latch pin portion 16c projecting from this outer end, and an initially cylindrical inner end portion 16d. Before riveting this inner end portion (as in Fig. 6) to the casing M¹ of the middle section I slide that portion 16d through a slot 17a (Fig. 15) in the lower lever 17, which slot is sufficiently tall to permit the lever to rock on the midlength portion 16a of the said latch post, and which slot has its riser sides disposed for preventing the said lever from rocking about the axis of that post.

When thus attached, the latch post has its bead 16b disposed for retaining the lower lever on this post, and the said lower lever has a relatively lower perforation 17b disposed for housing part of a lower latch pin 18 on tne lowest section L of the waffle iron when that lever depends by gravity as in Fig. 5, so that the bottom of the said perforation 17b is in underhooking relation to the pin P which projects from the lower section L.

With the parts thus constructed, I eliminate the need of pivot pins for both levers, am able to use simple punchings for both levers, and obtain an expeditious as well as inexpensive assembling of the selective latching provisions as well as a considerable concealing of these provisions. So also, the narrow spacing between the main part 9 of the handle-carrying bracket and the adjacent waffle iron section co-operates with the hooking formations on both the spring and the upper (bell-crank) lever for retaining these in their assembled dispositions without requiring auxiliary provisions for that purpose, although the fingers 14a on the bell-crank lever may swing into an adjacent perforation 8 (Fig. 7) in the shell side of the top section T when the bell-crank lever is raised as shown in Fig. 5.

However, while I have particularly described my new latch arrangement in connection with an embodiment including numerous desirable details of construction and arrangement, it will be obvious (particularly in view of Figs. 14 and 15) that many changes might be made without departing either from the spirit of my invention or from the appended claims.

I claim as my invention:

1. Selective section-interlatching means for a waffle iron of the class in which a middle section is hinged at the same side of the iron both to a bottom and a top section, comprising: two relatively superposed elements projecting at the opposite side of the iron respectively from the said middle and bottom sections; a lower and generally upright lever pivotally supported by the middle section and continually urged by gravity into hooking relation to the element projecting from the bottom section; an upper lever pivotally supported by the top section and having a portion thereof normally hooking under the element projecting from the middle section; the two levers having interengaging portions disposed so that the action of gravity on the lower lever normally causes the latter to hold the upper lever out of hooking relation to the element projecting from the middle section; and the upper lever being adapted to be digitally movable out of its said normal hooking relation, thereby permitting gravity to have the recited action on the lower lever.

2. Selective section-interlatching means for a waffle iron, as per claim 1, including a spring operatively interposed between the upper section and the upper lever for overbalancing the said action of gravity when the upper lever is not digitally moved out of its said normal hooking relation.

3. Waffle iron section inter-latching means for a waffle iron, as per claim 1, including a handle supported by and projecting from the top section at the same side of the iron with the said projecting elements, the handle having a downwardly open recess housing portions of both the spring and the upper lever, whereby the handle conceals the said housed portions and allows the housed portion of the upper lever to be disposed so near to the handle that the said upper lever can conveniently be moved in the recited direction by a finger of the hand grasping the handle.

4. Selective section-interlatching means for a three-section waffle iron, as per claim 1, including a U-shaped bracket having the free end portions of its U-shanks fastened to the said top section at the same side of the iron with the said projecting elements, and a handle fastened to and extending outwardly of the iron from the U-back of the said bracket; the upper lever being pivoted upon the U-back of the bracket.

5. Selective section-interlatching means for a three-section waffle iron, as per claim 1, including a U-shaped bracket having the free end portions of its U-shanks fastened to the said top section at the same side of the iron with the said projecting elements, and a handle fastened to and extending outwardly of the iron from the U-back of the said bracket; the upper lever being pivoted upon the U-back of the bracket; the U-back of the bracket having a horizontal slot and the upper lever having pivoting elements extending through the said slot for pivoting the lever upon the bracket.

6. Selective section-interlatching means for a three-section waffle iron, as per claim 1, including a U-shaped bracket having the free end portions of its U-shanks fastened to the said top section at the same side of the iron with the said projecting elements, and a handle fastened to and extending outwardly of the iron from the U-back of the said bracket; the upper lever being pivoted upon the U-back of the bracket; the upper lever having two horizontally spaced hook fingers extending through the slot for pivoting the lever upon the bracket; and a spring extending through the said slot between the said hook fingers and operatively interposed between the said top section and the upper lever for continually urging the latter lever to a position in which that lever permits gravity to have the recited normal action on the lower lever.

7. A waffle iron comprising three superposed sections interhinged at the same side of the iron and having a handle on the top section at the opposite side from the said interhinging, means for selectively latching the middle section to the bottom section, comprising: a pivot element fast upon and projecting from the middle section and underhanging the handle; a latch pin fast upon and projecting from the lowest section and underhanging the said pivot element; a lever pivoted intermediate its ends on the pivot element for movement about a horizontal axis substantially tangential to the adjacent side portion of the middle section; the lever comprising two arms diverging at an outwardly open obtuse angle, the lower arm having a part thereof hookingly underhanging the latch pin when the lever depends by gravity; and means movably supported by the top section and retractable by a finger of a hand grasping the said handle for normally pressing the upper arm of the said lever towards the adjacent side of the middle section so as to swing the lever to a position in which the said part of the lower arm of that lever is out of its latch pin underhanging disposition.

8. A waffle iron as per claim 7, in which the part of the pivot element on which the lever is pivoted has parallel upright sides and in which the lever has portions thereof respectively engaging the said sides of the pivot element to prevent the lever from rotating materially about the axis of the pivot element.

9. A waffle iron or the like having two superposed sections interhinged at the same side of the iron and having a pin projecting from the lower of the said sections at the opposite side of the iron; a bracket fastened to the top section at the same side with the said pin and including a portion extending parallel to and spaced outwardly from the adjacent side portion of the top section, the said bracket portion having a horizontal slot intermediate its height; a handle fastened to and projecting outwardly of the iron from the said bracket portion; a bell-crank lever presenting the juncture of its arms adjacent to the outer face of the said bracket portion and including two laterally spaced fingers extending through the said slot for pivoting the lever upon the bracket, the bell-crank lever including an upper arm extending outwardly of the iron below the handle and adapted to be raised by a finger of a hand grasping the handle, and a normally depending arm having a part thereof hookingly underhanging the said pin; and a spring extending through the said slot between the said fingers, the spring having an upturned inner end portion engaging a part of the side of the top section of the iron, the spring having a more outward portion pressing downwardly against the upper arm of the bell-crank lever, and the said upper lever arm being disposed so that it can be digitally raised against the pressure of the said spring by a finger of a hand grasping the handle.

10. A waffle iron having two superposed sections interhinged at the same side of the waffle iron, a bracket fastened to the top section at the opposite side from the said interhinging, the bracket having a portion thereof spaced outwardly from and extending parallel to the adjacent side portion of the top section; a handle fastened to and extending outwardly from the said bracket portion; a bell-crank lever pivoted upon the said bracket for movement about a horizontal axis, the said lever including an upper arm extending below and in the same general direction as the said handle; a latch element fast upon and projecting from the waffle iron section immediately below the said top section and below the said bracket, the said lever also having a depending arm disposed for hookingly engaging the latch element to limit the lifting of the top section with respect to the latter section; and spring means operatively interposed between the said bracket and the upper arm of the bell-crank lever for continually urging this lever to dispose the lower arm thereof in its said latch element engaging position; the upper arm of the bell-crank lever being disposed so that it can be raised against the pressure of the said spring, by a hand grasping the handle, for rocking this lever to move the lower arm thereof out of the said latch element engaging position.

11. A waffle iron assemblage as per claim 10, in which the latch element is a substantially horizontal pin and in which the lower arm of the bell-crank lever has a perforation through which a portion of this pin extends when the lever is in its said engaging position, so as to dispose the lower wall of the perforation for upward engagement with the said pin, the perforation being taller than the diameter of the said portion of the pin to permit a limited vertical movement of the waffle iron sections which respectively support the bell-crank lever and the said pin.

12. A waffle iron assemblage as per claim 10, in which the said portion of the bracket has a horizontal slot, and in which the spring has its inward portion bent to a hook formation and extending through the said slot so that the spring effectively has its hook bend pivoted on a wall of the said slot; and in which the spacing of the said bracket portion from the adjacent side of the waffle iron section to which the bracket is attached is sufficiently less than the length of the spring portion disposed between the said bracket and side to co-operate with the pivoting of the said hook bend for retaining the spring in its normal position without requiring auxiliary fastening elements.

13. A waffle iron assemblage as per claim 7, in which the said lever has a perforation through which the pivot element extends, in which the pivot pin has an enlargement outward of the lever for retaining the lever on the said pin, in which the said element also has a pin portion projecting beyond the said enlargement, and in which the said retractable means include an element hooking under the said projecting pin portion of the pivot element when the said means are not retracted.

14. In a waffle iron having three relatively superposed sections interhinged at one side of the iron and having a handle projecting from the uppermost of the said sections at the opposite side thereof, means for selectively interlocking the middle section with the bottom section; comprising: a generally upright lever consisting of a flat strip of stiff metal bent to an obtuse-angled formation and having its bend convexed toward the adjacent side of the said middle section, the lever having a perforation extending through its bend; a horizontal post extending through the said perforation in the lever and into the said middle section and having a peripheral bead disposed for retaining the lever on the post, and the lever being adapted to rock on the upper edge of the said post part about a horizontal axis transverse of the said riser sides; the said perforation and the part of the post extending through the perforation having parallel riser sides disposed for preventing a material rotation of the lever about the axis of the post; a horizontal pin projecting from the bottom section and underhanging the said post, the part of the lever below the said post depending normally by gravity close to the waffle iron and having a second perforation through which the said pin then extends when the lever is positioned only by the action of gravity; and lever-engaging means movably supported by the top section of the waffle iron for holding the lever in a second position in which the part of the lever having the said second perforation is disposed outward of the said pin.

15. Section-interlatching means for a waffle iron which has three relatively superposed sections hingedly connected at one side of the waffle iron, and which has a handle attached to the top section at the opposite side of the waffle iron from the said hinged connection, comprising: two vertically spaced and superposed pins projecting laterally respectively from the middle and the bottom section of the waffle iron and both underhanging the said handle; a generally upright lever pivoted intermediate its ends on the upper of the said two pins and having its arms diverging at an outwardly open oblique angle, the lower arm of the lever having an aperture through which the pin on the bottom extends when the lever depends freely by gravity; and a bell-crank lever pivoted on a horizontal axis upon the upper section adjacent to the inner end of the handle, the bell-crank lever comprising a generally horizontal arm underhanging the handle, and a depending arm having a perforation through which the pin on the middle section normally extends, the said depending arm depending outwardly of and normally bearing against the upper arm of the said generally upright lever; and a spring operatively interposed between the handle and the said horizontal arm of the bell-crank lever for continuously urging the said horizontal arm downwardly so as to press the depending arm of the bell-crank lever toward the upper arm of the generally upright lever with sufficient force for holding the last named lever in a position in which the lower arm of the generally upright lever extends freely past the outer end of the pin on the bottom section of the waffle iron.

16. In a waffle iron having three relatively superposed sections interhinged at the same side of the iron, and which has a handle fastened to the opposite side of the upper section, means for selectively interlocking the middle section with the bottom section and the top section, comprising: two relatively superposed pins projecting respectively from the middle section and the top section and disposed below the said handle; a lower lever pivoted intermediate its ends on the upper of the said pins, the lever having its lower arm normally depending vertically and having that arm provided with an aperture through which the lower pin normally extends, and having its upper arm diverging from the said lower arm at an outwardly open obtuse angle; an upper bellcrank lever pivotally supported upon the upper section of the waffle iron for movement about a horizontal axis substantially tangential to the juncture of the said upper section with the said handle, the said upper lever including an upper arm extending longitudinally of the handle adapted to be raised by a finger of a hand grasping the handle, and a second arm extending downwardly and normally bearing against the outer face of the said upper arm and having a perforation through which the pin on the stop section normally extends; and a spring operatively interposed between the said upper arm and the handle for continually urging the last named arm downwardly to press the said upper arm of the lower lever inwardly toward the middle section for causing the lower arm of the lever to extend outwardly of the said lower pin; the said aperture in the lower arm of the upper lever and the said perforation in the second arm of the upper lever being each sufficiently taller than the pins respectively associated with them to permit a limited vertical separation of the superposed sections of the waffle iron.

BERNHART A. BENSON.